United States Patent
Landgraf et al.

(10) Patent No.: US 10,150,357 B2
(45) Date of Patent: Dec. 11, 2018

(54) VEHICLE HAVING AN ENERGY STORAGE MEANS

(71) Applicant: AUDI AG, Ingolstadt (DE)

(72) Inventors: Johannes Landgraf, Gaimersheim (DE); Walter Schmidt, Rennertshofen (DE)

(73) Assignee: AUDI AG, Ingolstadt (DE)

( * ) Notice: Subject to any disclaimer, the term of this patent is extended or adjusted under 35 U.S.C. 154(b) by 30 days.

(21) Appl. No.: 15/316,090

(22) PCT Filed: May 19, 2015

(86) PCT No.: PCT/EP2015/001022
§ 371 (c)(1),
(2) Date: Dec. 2, 2016

(87) PCT Pub. No.: WO2015/185184
PCT Pub. Date: Dec. 10, 2015

(65) Prior Publication Data
US 2017/0120738 A1     May 4, 2017

(30) Foreign Application Priority Data

Jun. 7, 2014   (DE) .................. 10 2014 008 480

(51) Int. Cl.
*B60K 1/00* (2006.01)
*B60K 1/04* (2006.01)
(Continued)

(52) U.S. Cl.
CPC .............. *B60K 1/04* (2013.01); *B60K 15/063* (2013.01); *B60L 11/1809* (2013.01);
(Continued)

(58) Field of Classification Search
CPC .......... B60K 1/04; B60K 1/09; B60K 15/013; B60K 15/063; H01M 2/1077; H01M 2/1083; H01M 10/48
See application file for complete search history.

(56) References Cited

U.S. PATENT DOCUMENTS 4,365,681 A * 12/1982 Singh ....................... B60K 1/04
                                                     105/51
5,641,031 A *  6/1997 Riemer ................... B60K 1/04
                                                    180/68.5
(Continued)

FOREIGN PATENT DOCUMENTS

CN        1357465 A     7/2002
CN      100572123 C    12/2009
(Continued)

*Primary Examiner* — Hau V Phan
(74) *Attorney, Agent, or Firm* — Seed IP Law Group LLP

(57) ABSTRACT

A vehicle (52) is provided having at least one battery (35) for supplying at least one drive of the vehicle (52) with electricity, and having at least one gas storage device (33). At least one part of the gas storage device (33) and at least one part of the battery (35) are combined in a structural unit (32) and arranged on an underbody (31) of the vehicle (52). A method for charging a battery (35) in a vehicle (52) is also provided, in which method at least one part of a battery (35) combined in a structural unit (32) with at least one part of a gas storage device (33) is supplied with electricity by a fuel cell comprised by the vehicle (52).

11 Claims, 7 Drawing Sheets

(51) Int. Cl.
*B60K 15/063* (2006.01)
*B60L 11/18* (2006.01)
*B60K 15/03* (2006.01)

(52) U.S. Cl.
CPC ....... *B60L 11/1851* (2013.01); *B60L 11/1887* (2013.01); *B60K 2001/0438* (2013.01); *B60K 2001/0455* (2013.01); *B60K 2001/0472* (2013.01); *B60K 2015/03315* (2013.01); *B60K 2015/0634* (2013.01); *B60L 2240/547* (2013.01); *B60Y 2300/91* (2013.01); *B60Y 2400/112* (2013.01); *B60Y 2400/202* (2013.01)

(56) References Cited

U.S. PATENT DOCUMENTS

| | | | | |
|---|---|---|---|---|
| 5,673,939 A * | 10/1997 | Bees | ........................ | B60K 1/04 280/831 |
| 5,704,644 A * | 1/1998 | Jaggi | ........................ | B60K 1/00 180/311 |
| 6,220,380 B1 * | 4/2001 | Mita | ........................ | B60K 1/04 180/65.1 |
| 6,227,322 B1 * | 5/2001 | Nishikawa | ............... | B60K 1/04 180/65.1 |
| 6,378,637 B1 | 4/2002 | Ono et al. | | |
| 6,648,085 B2 * | 11/2003 | Nagura | ................... | B60K 1/00 180/65.1 |
| 6,715,571 B2 | 4/2004 | Nakamori | | |
| 6,948,226 B2 * | 9/2005 | Chernoff | ................ | B62D 33/02 29/428 |
| 7,000,716 B2 * | 2/2006 | Leifert | ..................... | B60K 1/04 180/65.1 |
| 7,441,615 B2 * | 10/2008 | Borroni-Bird | ........... | B60G 3/18 180/402 |
| 7,614,473 B2 * | 11/2009 | Ono | ......................... | B60K 1/04 180/291 |
| 8,739,907 B2 * | 6/2014 | Storc | ....................... | B60K 1/04 180/65.29 |
| 8,827,023 B2 * | 9/2014 | Matsuda | ................. | B60K 1/04 180/68.5 |
| 8,998,024 B2 * | 4/2015 | Franzen | .................... | F17C 1/16 220/203.24 |
| 2002/0060100 A1 | 5/2002 | Nagura et al. | | |
| 2004/0062955 A1 * | 4/2004 | Kubota | ................... | B60K 1/04 429/9 |
| 2006/0289224 A1 | 12/2006 | Ono et al. | | |
| 2007/0039767 A1 | 2/2007 | Kondo | | |
| 2008/0093140 A1 | 4/2008 | Asai et al. | | |
| 2009/0133948 A1 * | 5/2009 | Ijaz | ...................... | B60K 15/013 180/69.4 |
| 2009/0145676 A1 * | 6/2009 | Takasaki | .................. | B60K 1/04 180/65.1 |
| 2012/0312610 A1 * | 12/2012 | Kim | .................... | H01M 2/1077 180/65.31 |

FOREIGN PATENT DOCUMENTS

| | | |
|---|---|---|
| DE | 101 54 353 A1 | 5/2002 |
| DE | 10 2008 012 406 A1 | 9/2009 |
| DE | 10 2008 061 493 A1 | 6/2010 |
| DE | 10 2012 016 011 A1 | 3/2013 |
| DE | 10 2013 000 626 A1 | 7/2014 |
| JP | 2004-127747 A | 4/2004 |
| JP | 2011-13960 A | 1/2011 |
| WO | 2004/030968 A1 | 4/2004 |
| WO | 2006/067962 A1 | 6/2006 |

* cited by examiner

VEHICLE HAVING AN ENERGY STORAGE MEANS

BACKGROUND

Technical Field

The present invention relates to a vehicle having at least one battery for supplying at least one drive of the vehicle with electricity, and at least one gas storage means. Furthermore, the present invention relates to a method for charging a battery in a vehicle.

Description of the Related Art

As a consequence of the ever increasing shortage of fossil fuels and an associated increasing economic inefficiency of traditional or conventional combustion engines for the combustion of diesel or gasoline, alternative drive concepts are increasingly being developed and produced. Often times, alternative drive systems are characterized in that a vehicle is electrically driven at least in part, wherein electric drives used in an alternative drive concept are generally combined with a combustion engine that can, for example, be used to charge a battery of the electric drive system.

A combination of an electric drive and a combustion engine or a fuel cell can significantly increase the range of a vehicle compared to an electric drive exclusively supplied by batteries. However, since—for a combination of different drive systems—a respective vehicle must comprise all components necessary for the sole operation of a respective drive system, installation spaces or the available installation space volume of a vehicle equipped with several drive systems run(s) significantly short.

In order to use components such as gas tanks for storing, for example, hydrogen as fuel for a fuel cell, together with batteries, in particular what are known as high-volt, i.e., high-voltage, batteries, the prior art describes installation spaces of vehicles (such as a trunk) that are adapted to an increased space requirement as a result of several drive systems and are thus limited in their actual function, e.g., accommodating luggage. The prior art describes vehicles with several drive systems, wherein the respective components of the respective drive systems are arranged in specifically designed installation spaces.

U.S. Patent Publication No. 2007/0039767 A1 relates to a fuel cell vehicle, wherein fuel cells are arranged underneath a front seat and wherein a battery is arranged under a rear seat. Furthermore, the US-American document describes that a hydrogen supply is arranged in a center tunnel of a respective vehicle.

German Publication No. DE 10 2012 016 011 A1 describes a fuel cell vehicle that comprises a first energy storage means designed as a hydrogen tank and a second energy storage means designed as a battery, wherein the first energy storage means is firmly installed in the fuel cell vehicle and another reserve energy storage means is designed to be exchangeable or removable from the fuel cell vehicle.

German Publication No. DE 101 54 353 A1 relates to a modular vehicle construction which comprises a vehicle body and a vehicle chassis coupled with the vehicle body, wherein the vehicle chassis comprises a frame and a shell coupled with the frame, said shell providing a storage means for an energy source for supplying a drive system. This means that, in the German publication, additional installation space for accommodating components of the drive system is provided by means of the shell compared to a conventional design or a conventional construction.

BRIEF SUMMARY

Against this background, a vehicle having at least one battery for supplying at least one drive of the vehicle with electricity and at least one gas storage means is presented, wherein at least one part of the gas storage means and at least one part of the battery are combined in a structural unit and arranged on an underbody of the vehicle.

A gas storage means in the context of the present invention refers to a number of tanks, wherein a tank or all tanks of the gas storage means can be present as part of the structural unit.

A battery in the context of the present invention refers to an arrangement of at least one battery cell, i.e., one battery module, wherein one battery cell or all battery cells of the battery can be provided as part of the structural unit.

DETAILED DESCRIPTION

The vehicle according to the invention comprises in particular a fuel cell drive that, for example, oxidizes hydrogen and thereby generates electricity for supplying a respective drive, i.e., an electric motor. In order to store a quantity of electricity (i.e., a quantity of energy) generated by the fuel cell and to provide it to the electric drive when needed, the vehicle according to the invention comprises a drive battery which is in particular designed as what is known as a high-voltage battery and possibly comprises several parts, i.e., modules, wherein at least one part of the drive battery is part of the structural unit.

In order to neither limit an existing interior space volume, such as a trunk volume, nor have to redesign, i.e., reshape, regions—such as the vehicle chassis—that are essential for the driving dynamics of the vehicle, it is provided that at least one part of a gas storage means provided for supplying the fuel cell with fuel, i.e., for example hydrogen, is combined into a structural unit with at least one part of the battery for supplying the electric drive and arranged on an underbody of the vehicle.

By means of a combination of battery and gas storage means in a structural unit, a compact structural element is created which can be integrated into an existing installation space (such as a center tunnel) of the vehicle according to the invention and thus, as a result of a compact construction of the structural unit, reduces an expense in, for example, a construction of a supply of components of the structural unit, i.e., of the at least one part of the gas storage means and the at least one part of the battery.

The required installation space for the arrangement of the structural unit and for supply lines required for supplying the structural unit can be reduced as a result of the arrangement of the structural unit on an underbody, in particular a center tunnel of a respective vehicle, which arrangement is made possible by the compact construction of the structural unit. Furthermore, the required length of the supply lines can be reduced via an arrangement of the structural unit in the vicinity of a respective drive, since the supply lines can be connected to the respective drive directly, i.e., without detours through possibly occurring pass-through openings from a vehicle interior to the outside.

As a result of a combination of gas storage means and battery in a structural unit, fastening means for connecting the respective individual components can furthermore be saved and central fastening means for connecting the one structural unit to (for example) an underbody of the vehicle (via a carrier, i.e., a carrier frame, for example) can be used.

By means of the structural unit provided according to the invention, a vehicle that is—for example—designed for a conventional operation of a combustion engine can be equipped with an alternative drive system via an integration of the structural unit into, for example, a center tunnel that is generally provided to accommodate exhaust components or a power-transmission unit, for example, even without additional installation space needing to be provided for an energy supply of the alternative drive system.

By using a structural unit composed of gas storage means and battery, it is possible to integrate an alternative drive, i.e., an alternative drive system, such as a fuel cell, into an existing vehicle construction optimized for a conventional combustion engine, without limiting or rearranging a vehicle interior space, such that additional design effort can be avoided, in particular with regard to the interior space of the vehicle.

A possible embodiment of the vehicle according to the invention provides that the components combined in the structural unit are supplemented by additional components, such as parts of a gas storage means or parts of a battery, that are arranged in an engine compartment of the vehicle, for example.

In order to increase an available quantity of energy, and as a result for example a range of a respective vehicle, a capacity or volumetric capacity of both the at least one part of the battery and the at least one part of the gas storage means can be increased by additional parts, arranged in the respective vehicle, of the battery and/or of the gas storage means, wherein the additionally arranged parts must not be comprised by the structural unit but can be arranged in a vehicle independently of the structural unit.

A structural unit in the context of the proposed invention refers to a combination of several components, in particular at least one part of a battery and at least one part of a gas storage means, wherein the components are connected via, for example, a carrier frame so that the components are connected to a vehicle via a common fastening system.

Another possible embodiment of the vehicle according to the invention provides that the shape of the structural unit is adapted to the underbody of the vehicle so that a positive transition from the structural unit to the underbody of the vehicle exists.

In order to utilize an installation space provided by a construction of a respective vehicle as efficiently as possible, it is provided that the structural unit provided according to the invention is adapted to a respective installation space so that the respective installation space is densely filled with respective components comprised by the structural unit, and a positive transition of the structural unit to the underbody of the vehicle exists. By means of a positive transition, both installation space can be saved and the vehicle can be protected by the structural unit provided according to the invention, without the vehicle being negatively impacted in its driving characteristics (for example by underbody spoilers).

If the structural unit provided according to the invention delimits the vehicle at the outside, an aerodynamically optimized shape can be achieved as a result of a positive transition of the structural unit to the vehicle or the underbody of the vehicle. Furthermore, additional components that are arranged on, for example, the underbody of the vehicle can be shielded by the structural unit from influences from the outside. As a result of such a shielding, for example, corrosion of vehicle parts arranged in the respective installation space (in particular of a cabling or an exhaust system) can be reduced.

Another possible embodiment of the vehicle according to the invention provides that the structural unit is exchanged by means of a quick-release fastener.

Since batteries have a limited useful life and must be exchanged after a predetermined number of charging cycles, it is provided that the structural unit provided according to the invention is arranged on the vehicle by means of quick-release fasteners, such as in the form of bayonet locks or electromagnetic interlocks or any other technically suitable locking method or connection type that allows for quick and convenient access to the structural unit. Via an exchange of the structural unit, i.e., the energy storage means, a vehicle "running on empty," i.e., a vehicle that does not have any residual energy reserves in the battery or the gas storage means, can very quickly be equipped for an onward journey or a continued operation by an exchange of the "emptied" structural unit with a filled or charged structural unit.

Another possible embodiment of the vehicle according to the invention provides that the structural unit is arranged in a center tunnel of the vehicle.

Since traditional vehicles (driven for example via a combustion engine) generally already comprise a center tunnel in which components, i.e., vehicle parts such as an exhaust system, are arranged, it is provided that the structural unit is arranged in a center tunnel of a respective vehicle so that the installation space provided by the center tunnel is optimally utilized and a high mass of the structural unit (caused by the compact design of the structural unit provided according to the invention) is used to shift a center of gravity of the respective vehicle into the center tunnel, and to thereby balance out the respective vehicle as optimally as possible.

Another possible embodiment of the vehicle according to the invention provides that the structural unit comprises—in addition to the at least one part of the gas storage means, the at least one part of the battery, and the carrier frame—an "e-box" to control the at least one part of the battery comprised by the structural unit.

Since a battery provided for supplying a respective drive of a respective vehicle is supplied with electricity in complex charging and discharging processes (by a generator, for example), a control device—what is known as an "e-box"—is generally provided which monitors or regulates the charging and discharging processes of the battery. In order to reduce complex cabling between the "e-box" and the battery, it is provided that the "e-box" is integrated into the structural unit provided according to the invention. By integrating the "e-box" into the structural unit, it is possible that activities such as driving performances or a condition of the at least one part of the battery or of the gas storage means of a respective structural unit can be stored in the "e-box" or polled by the "e-box" so that, for example, an exchange of a structural unit or a current status of the structural unit can be quickly and efficiently identified, for example by means of a reading device, even without a corresponding vehicle.

Another possible embodiment of the vehicle according to the invention provides that the structural unit is arranged in a region between two axles of the vehicle.

By arranging the structural unit provided according to the invention between respective axles of a vehicle, supply lines from the structural unit to (for example) electric motors comprised by the respective axles or wheels of the respective axles can be run not only directly, i.e., without any possibly provided pass-through openings in an underbody of the vehicle, but also in a comparable length so that a required cable length to connect the structural unit to (for example)

a motor of a front axle and a motor of a rear axle have [sic] a same length, and thus a same electrical resistance, and accordingly can be controlled with a same latency or delay caused by the supply lines of the same length. As a result of a comparable latency, for example synchronous control times or a synchronous control behavior between different electric motors on different axles of the vehicle can be realized, and overvoltages can thus be prevented.

Another possible embodiment of the vehicle according to the invention provides that the structural unit is arranged at a position of the vehicle that is optimized for a weight distribution of the vehicle.

By arranging the structural unit in a center tunnel, for example, in particular between respective axles of a respective vehicle, as a result of its own high weight the structural unit can be used to determine or balance (i.e., adjust) a respective center of gravity of the respective vehicle. For this purpose, the structural unit can be moved depending on the design of the respective vehicle—for example within the center tunnel—so that the center of gravity of the respective vehicle shifts into a center of the respective vehicle.

It is also conceivable that the structural unit is placed within a region of a front or rear axle of the respective vehicle so that a weight load on the respective axle is increased, and as a result a better delay in a braking maneuver can be achieved or the vehicle can be better stabilized in a braking maneuver than could be achieved given a conventional arrangement of drive components in, for example, an interior space of the vehicle.

Another possible embodiment of the vehicle according to the invention provides that the structural unit comprises a carrier frame that connects the structural unit to the vehicle.

By means of a carrier frame (that can be designed in the shape of a V or U, for example), the structural unit can be connected to the respective vehicle so that the at least one part of the battery and the at least one part of the gas tank are fixed by the carrier frame and are arranged firmly, possibly positively, on the respective vehicle, in particular on the center tunnel of the respective vehicle. The carrier frame can, for example, be composed of metal, plastics, carbon, or any other technically suitable material or any other combination of suitable materials for fixing or arranging drive components on a vehicle.

Furthermore, the presented invention comprises a method for charging a battery in a vehicle, in which method at least one part of a battery combined in a structural unit with at least one part of the gas storage means is supplied with electricity by a fuel cell comprised by a vehicle, wherein the electricity is generated from a combustion gas provided by the at least one part of the gas storage means.

The method according to the invention serves in particular to operate an electrically driven vehicle, wherein an electric drive comprised by a respective vehicle is supplied with electricity by both a fuel cell that is supplied with a fuel (such as hydrogen) by the gas storage means comprised by the at least one structural unit, and by a battery, in particular a high-voltage drive battery. It is in particular provided that the fuel cell delivers the electrical energy generated by oxidation of the fuel or of a reducing agent to the battery, which is at least partially integrated into the structural unit, and the battery supplies electrical energy to respective electric motors of the vehicle. The method according to the invention is accordingly based on a conversion of chemical energy into electrical energy, wherein both forms of energy are stored at a central location, namely the structural unit. Maintenance, regulation, and inspection work on respective energy storage means can thus be performed centrally so that the effort required for the respective work is reduced compared to a partial maintenance, regulation, or inspection of individual, i.e., separate, energy storage means.

Another possible embodiment of the method according to the invention provides that the at least one part of the battery is regulated, i.e., its charge and discharge current is adjusted, via a control device arranged in the structural unit.

Via a combination of the at least one part of the gas storage means and the at least one part of the battery into one structural unit, a current energy content contained in the structural unit by the at least one part of the gas storage means and/or the battery can be detected (for example using an "e-box," i.e., a control device, also comprised by the structural unit) and an operation of the respective vehicle can be adapted to the current energy content, for example via an increased or reduced fuel cell utilization.

Another possible embodiment of the method according to the invention provides that a high-voltage system of the vehicle that is supplied with electricity by the structural unit is deactivated by disconnecting an isolating plug at an easily accessible position in an interior space of the vehicle.

Since a safe salvage of (for example) a wrecked vehicle is possible as a result of a conventional arrangement of batteries to supply a drive with electricity in, for example, an interior space or at an easily accessible location within a chassis of the vehicle, [sic] generally an easily accessible location for an isolating plug that decouples the battery from a high-voltage system of the vehicle, an additional isolating plug is provided at an easily accessible location, for example in an interior space of a respective vehicle, in an arrangement of the structural unit provided according to the invention on an underbody or a center tunnel of the vehicle so that, in case of an accident, the isolating plug can be easily operated by rescue workers or service personnel and the vehicle can thus be salvaged safely. Additional advantages and embodiments of the invention result from the description and the accompanying drawings.

It goes without saying that the features mentioned above and the features yet to be explained below can be used not only in the respectively specified combination but also in other combinations or alone, without leaving the scope of the present invention.

BRIEF DESCRIPTION OF THE SEVERAL VIEWS OF THE DRAWINGS

The invention is illustrated schematically using embodiments in the drawings and is described schematically and in detail with reference to the drawings.

ADDITIONAL DETAILED DESCRIPTION

Figure 1:
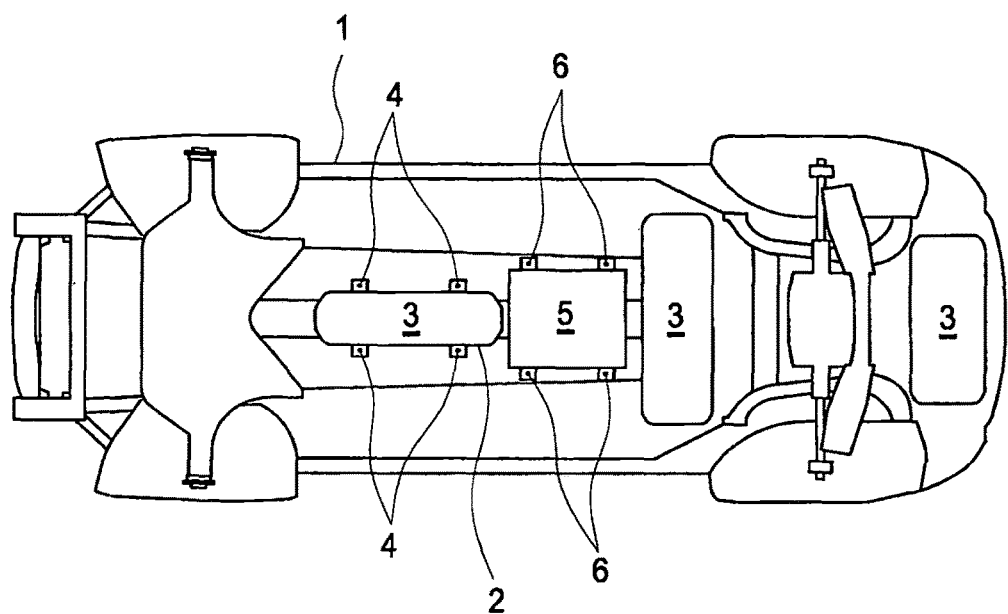
FIG. 1 shows a schematic representation of an arrangement of components of an alternative drive concept according to the prior art.

The prior art illustrated in FIG. 1 shows a vehicle chassis 1, in which a part 2 of a gas storage means 3 is arranged on the vehicle chassis 1 via fastening means 4. Furthermore, a battery 5 is arranged on the vehicle chassis 1 via fastening means 6. In this instance, both the part 2 of the gas storage means 3 and the battery 5 are flat so that the vehicle chassis 1 serves only as a carrier for the part 2 of the gas storage means 3 and the battery 5, and additional components possibly to be arranged on the vehicle chassis 1 must possibly be arranged around the part 2 of the gas storage means 3 and the battery 5 or at another location, such as in an interior space.

Figure 2:
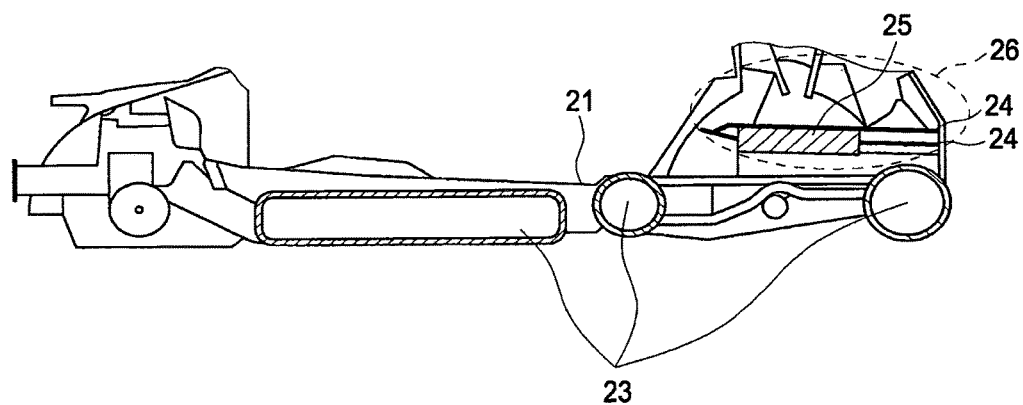
FIG. 2 shows a cross-section of a schematic representation of another arrangement of components of an alternative drive concept according to the prior art.

FIG. 2 shows a cross-section through a vehicle chassis 21 that carries a gas storage means 23 and a battery 25, wherein the battery 25 is arranged via fastening means 24 in a region 26 which is used as a trunk in a conventional drive concept, such that a usable trunk volume of a vehicle equipped with the vehicle chassis 21 is reduced compared to a conventional vehicle chassis with a combustion engine and without the battery 25.

Figure 3:
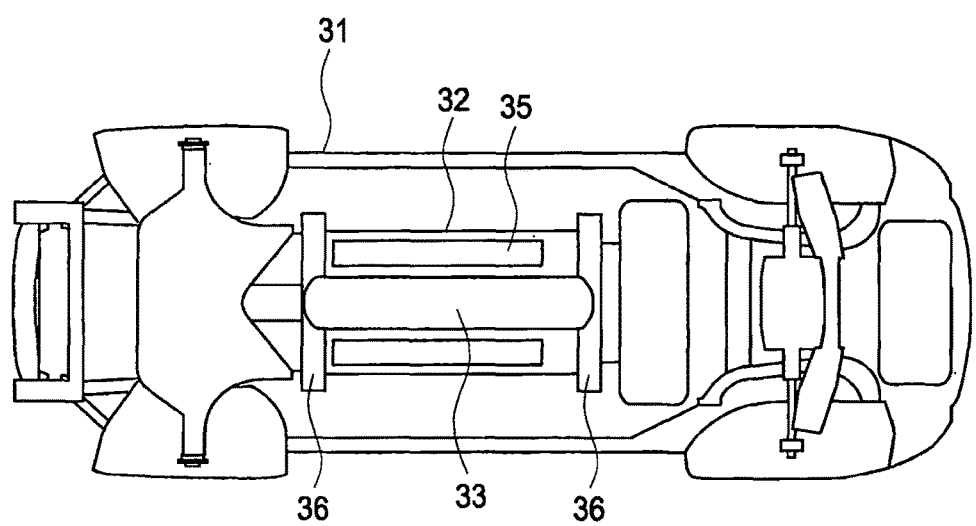
FIG. 3 shows a schematic representation of an underbody of a possible embodiment of the vehicle according to the invention.

Arranged on the vehicle chassis 31 illustrated in FIG. 3 is a structural unit 32 which comprises a battery 35, a carrier frame 36, and a gas storage means 33. The structural unit 32 is connected via the carrier frame 36 to a center tunnel of the vehicle chassis 31 so that the structural unit 32 is lowered into the center tunnel and the gas storage means 33 delimits the structural unit 32 toward the outside, i.e., toward a road surface, so that the gas storage means 33 is used as bottom-out protection, i.e., as protection for the battery 35 against forces possibly acting on it from the outside. Furthermore, the structural unit 32 comprises at least parts of supply lines, i.e., gas lines, high-voltage lines, and cooling lines from and to the gas storage means 33 or the battery 35.

Figure 4:
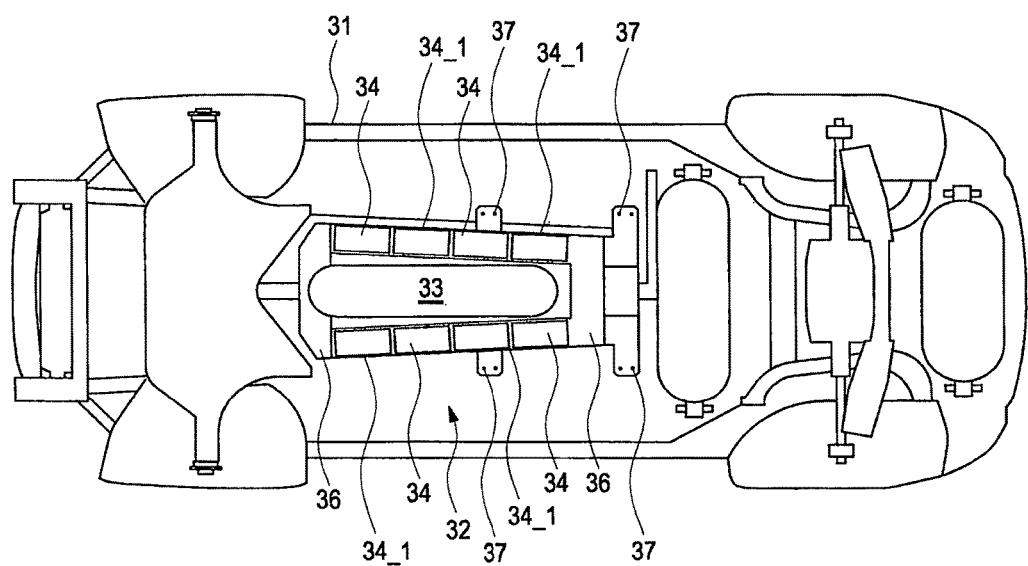
FIG. 4 shows a detailed view of the schematic representation of FIG. 3.

FIG. 4 shows a detailed view of the vehicle chassis 31. The carrier frame 36 is screwed to the longitudinal spars of the center tunnel of the vehicle chassis 31 by fastening means 37. The carrier frame 36 comprises chambers 34_1 in which parts, i.e., modules or cells, of the battery 34 are arranged so that the battery 34 is rigidly connected to the carrier frame 36 and, as a result, also to the gas storage means 33. The rigid connection of the battery 34 and the gas storage means 33 to the carrier frame 36 and, as a result, to the vehicle chassis 31 results in a high safety in the event of an accident, since forces acting on the structural unit 32 can be diverted to the vehicle chassis 31 and, because of the fastening means 37, a tearing of the structural unit 32 off the vehicle chassis 31 is prevented.

Figure 5:
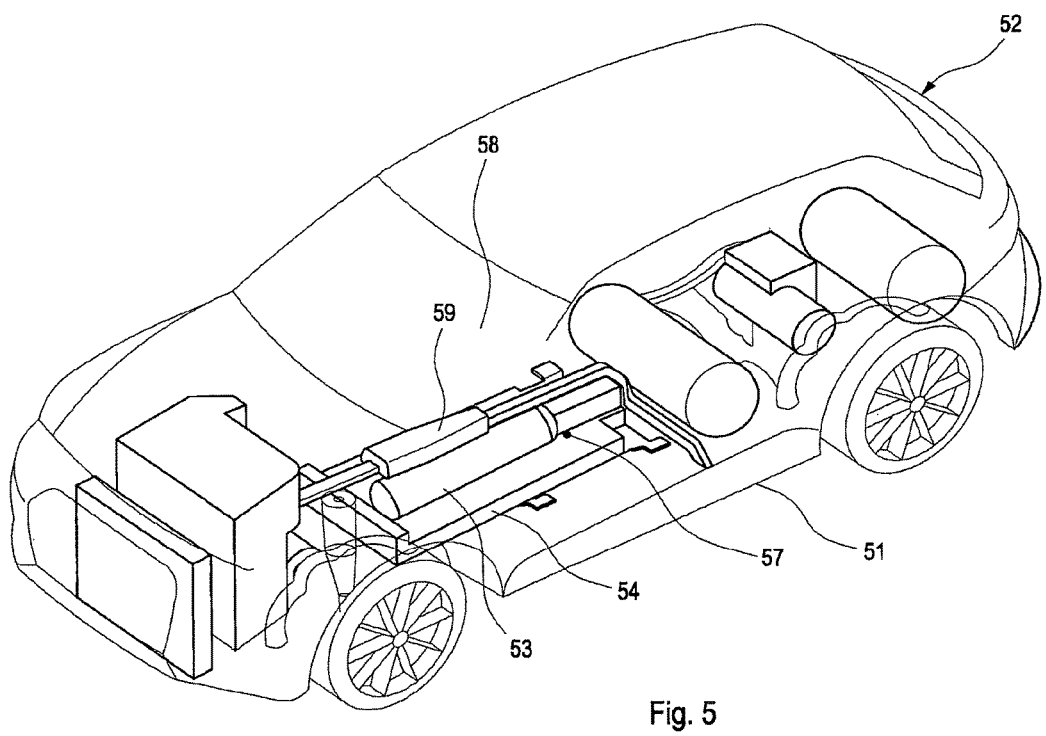
FIG. 5 shows a view of another possible embodiment of the vehicle according to the invention.

The view illustrated in FIG. 5 shows a vehicle 52 having a vehicle chassis 51, wherein the vehicle chassis 51 comprises a center tunnel in which an exhaust system 59, a structural unit 53, and a carrier frame 54 are arranged. By arranging the structural unit 53 within the center tunnel, an interior space 58 of the vehicle 52 remains unchanged in terms of an available volume or installation space compared to a conventional construction, in which only the exhaust system 59 is arranged in the center tunnel. Furthermore, the exhaust system 59 is shielded by the structural unit 53 against possibly harmful influences from the outside.

The structural unit 53 is integrated into the center tunnel of the vehicle 52 such that a center of gravity of the vehicle 52 is located at a vehicle center point 57, whereby the vehicle 52 stays stable in case of high driving or centrifugal forces, and in particular in case of load changes.

Figure 6:
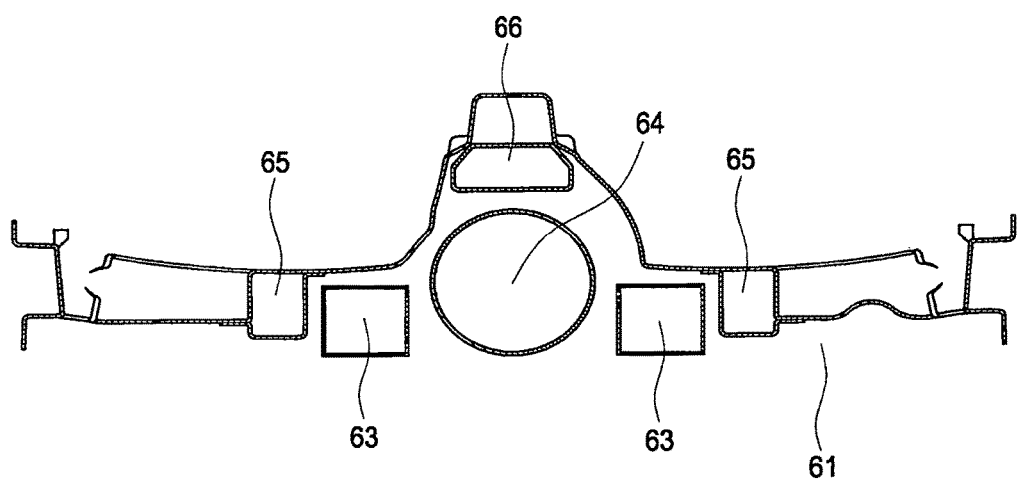
FIG. 6 shows a schematic representation of a cross-section of another possible embodiment of the vehicle according to the invention.

The cross-section illustrated in FIG. 6 through a vehicle chassis 61 shows longitudinal spars 65 of a vehicle frame to which are attached chambers 63 for accommodating parts of a battery. A gas storage means 64 is arranged centrally in a center tunnel of the vehicle chassis 61 and delimits the chambers 63 against a device, also arranged in the center tunnel, for transferring forces between respective axles, i.e., for example a drive shaft 66.

Figure 7:
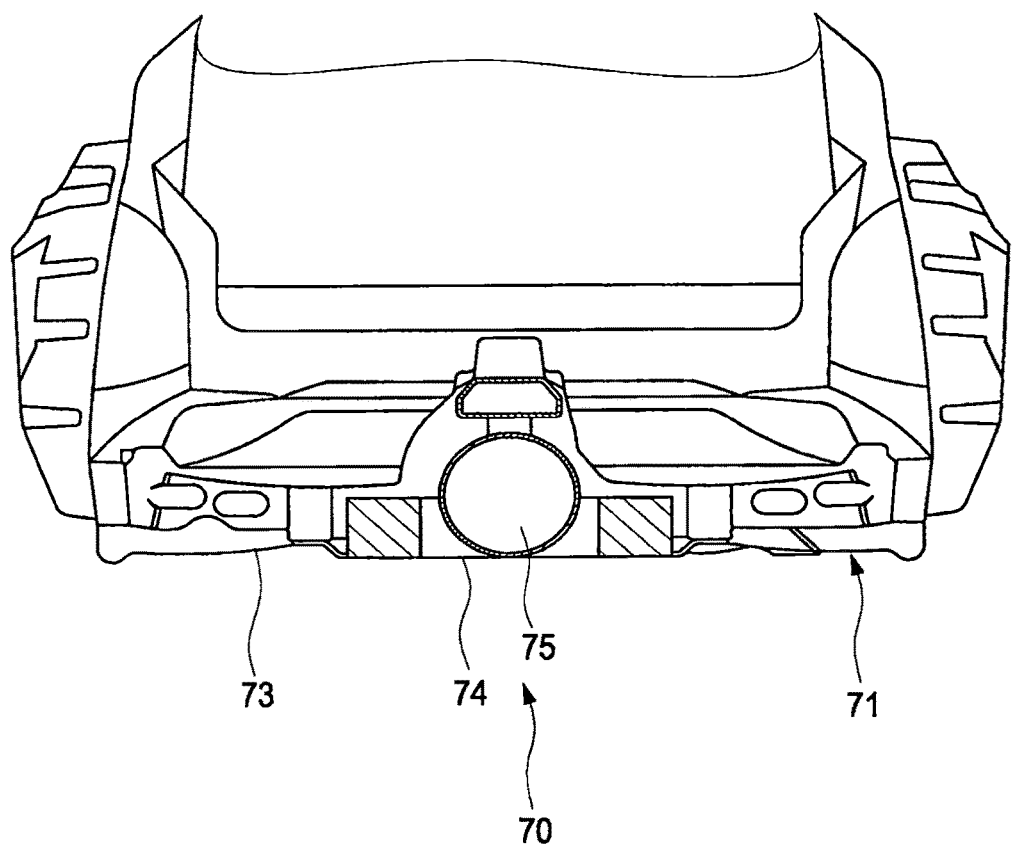
FIG. 7 shows a schematic representation of a cross-section of another possible embodiment of the vehicle according to the invention.

The cross-section, illustrated in FIG. 7, of a vehicle chassis 71 shows a positive transition between a structural unit 72 and an underbody 73 of the vehicle chassis 71. A carrier frame 74 comprised by the structural unit 72 delimits the structural unit toward the outside, i.e., toward a road surface. The carrier frame 74 can, for example, be integrated into underbody spoilers to increase a contact pressure when driving and can have a corresponding outer shape.

The invention claimed is:

1. A vehicle, comprising:
   at least one battery configured to supply at least one drive of the vehicle with electricity, the at least one battery having a plurality of battery modules or battery cells;
   a structural unit that includes a carrier frame that connects the structural unit to the vehicle, the carrier frame having distinct chambers;
   at least one gas storage means combined with the plurality of battery modules or battery cells of the battery in the structural unit and arranged on an underbody of the vehicle, each battery module or battery cell of the battery being in a respective one of the distinct chambers of the carrier frame; and
   an e-box provided in the structural unit and being configured to monitor or regulate charging and discharging processes of the battery which is configured to supply at least one drive of the vehicle with electricity.

2. The vehicle according to claim 1 wherein the shape of the structural unit is adapted to the underbody of the vehicle to have a positive transition from the structural unit to the underbody of the vehicle.

3. The vehicle according to claim 1 wherein the structural unit is exchanged by a quick-release fastener.

4. The vehicle according to claim 1 wherein the structural unit is arranged in a center tunnel of the vehicle.

5. The vehicle according to claim 4 wherein the center tunnel of the vehicle includes both the structural unit and at least one part of an exhaust system of the vehicle.

6. The vehicle according to claim 4 wherein the center tunnel of the vehicle includes both the structural unit and at least one device to transfer driving energy to a rear axle of the vehicle.

7. The vehicle according to claim 1 wherein the structural unit is arranged in a region between two axles of the vehicle.

8. The vehicle according to claim 1 wherein the gas storage means is a hydrogen storage means.

9. The vehicle according to claim 1 wherein the battery is a high-voltage battery to supply the at least one drive of the vehicle with electricity.

10. A method, comprising:
    supplying at least one drive of a vehicle with electricity from at least one battery, the vehicle including a structural unit that includes a carrier frame that connects the structural unit to the vehicle, the carrier frame having chambers, the vehicle including at least one gas storage means, at least one part of the gas storage means and at least one part of the battery being combined in the structural unit and arranged on an underbody of the vehicle, and respective parts of the battery of the vehicle being in the chambers;

supplying electricity to the at least one part of the battery combined in the structural unit with the at least one part of a gas storage means by a fuel cell comprised by the vehicle; and regulating charging or discharging of the at least one part of the battery via a control device arranged in the structural unit depending on a fill level of the at least one part of the gas storage means.

11. The method according to claim 10, further comprising:

deactivating a high-voltage system of the vehicle, which high-voltage system is supplied with electricity by the at least one battery, by disconnecting an isolating plug at a position in an interior space of the vehicle.

* * * * *